(12) United States Patent
Lee et al.

(10) Patent No.: US 11,557,923 B2
(45) Date of Patent: Jan. 17, 2023

(54) MULTI-DEVICE WIRELESS CHARGER AND ELECTRONIC DEVICE WIRELESSLY CHARGED BY THE SAME

(71) Applicant: Samsung Electronics Co., Ltd., Gyeonggi-do (KR)

(72) Inventors: Byongjeon Lee, Gyeonggi-do (KR); Jaedeok Cha, Gyeonggi-do (KR); Jongmin Kim, Gyeonggi-do (KR); Seongtaek Kwon, Gyeonggi-do (KR); Haesoo Kim, Gyeonggi-do (KR); Bohyeon Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 16/843,958

(22) Filed: Apr. 9, 2020

(65) Prior Publication Data
US 2020/0328624 A1 Oct. 15, 2020

(30) Foreign Application Priority Data
Apr. 11, 2019 (KR) .......................... 10-2019-0042621

(51) Int. Cl.
*H02J 7/00* (2006.01)
*H02J 50/40* (2016.01)
(Continued)

(52) U.S. Cl.
CPC .............. *H02J 50/40* (2016.02); *H01F 27/36* (2013.01); *H01F 38/14* (2013.01);
(Continued)

(58) Field of Classification Search
USPC .......................... 320/106, 107, 108, 109, 110
See application file for complete search history.

(56) References Cited

U.S. PATENT DOCUMENTS 9,793,743 B2 10/2017 Chien et al.
10,270,276 B2 4/2019 Kim et al.
(Continued)

FOREIGN PATENT DOCUMENTS

CN 107872967 A * 4/2018 .......... A61B 17/068
JP 2017-200339 A 11/2017
(Continued)

OTHER PUBLICATIONS

International Search Report dated Jul. 27, 2020.

*Primary Examiner* — Brian Ngo
(74) *Attorney, Agent, or Firm* — Cha & Reiter, LLC

(57) ABSTRACT

An electronic device is disclosed. The electronic device discloses a plurality of wireless charging antennas, a plurality of shielding partition layers, at least some of the plurality of shielding partition layers disposed between the plurality of wireless charging antennas, a plurality of external device-receiving grooves formed through spaces defined between pairs of the shielding partition layers, and a processor electrically coupled to the plurality of wireless charging antennas. The processor is configured to: determine whether at least one external device is inserted into at least one of the plurality of external device-receiving grooves, and when the at least one external device is inserted into the at least one of the plurality of external device-receiving grooves, wirelessly transmit power through at least one wireless charging antenna corresponding to the at least one of the plurality of external device-receiving grooves into which the at least one external device is inserted.

14 Claims, 12 Drawing Sheets

(51) Int. Cl.
    *H02J 7/02*          (2016.01)
    *H02J 50/70*       (2016.01)
    *H02J 50/10*       (2016.01)
    *H02J 50/80*       (2016.01)
    *H01F 38/14*       (2006.01)
    *H01F 27/36*       (2006.01)

(52) U.S. Cl.
    CPC ........ *H02J 7/00032* (2020.01); *H02J 7/0048* (2020.01); *H02J 7/02* (2013.01); *H02J 50/10* (2016.02); *H02J 50/70* (2016.02); *H02J 50/80* (2016.02)

(56) References Cited

U.S. PATENT DOCUMENTS

| | | | |
|---|---|---|---|
| 2009/0140691 A1 | 6/2009 | Jung | |
| 2013/0099730 A1 | 4/2013 | Toon | |
| 2014/0139178 A1 | 5/2014 | Large et al. | |
| 2015/0036279 A1* | 2/2015 | Erdman | G06F 1/1628 361/679.48 |
| 2015/0200555 A1 | 7/2015 | An | |
| 2015/0326060 A1 | 11/2015 | Young | |
| 2017/0047769 A1* | 2/2017 | Kim | H02J 7/0042 |
| 2017/0317532 A1* | 11/2017 | Kanagawa | H01F 27/02 |
| 2018/0226828 A1 | 8/2018 | Files et al. | |
| 2020/0328624 A1* | 10/2020 | Lee | H01F 27/36 |

FOREIGN PATENT DOCUMENTS

| | | |
|---|---|---|
| KR | 10-2013-0045087 A | 5/2013 |
| KR | 10-2015-0107671 A | 9/2015 |
| KR | 10-2017-0020147 A | 2/2017 |
| WO | 2016/195145 A1 | 12/2016 |

\* cited by examiner

MULTI-DEVICE WIRELESS CHARGER AND ELECTRONIC DEVICE WIRELESSLY CHARGED BY THE SAME

CROSS-REFERENCE TO RELATED APPLICATION

This application is based on and claims priority under 35 U.S.C. 119 to Korean Patent Application No. 10-2019-0042621, filed on Apr. 11, 2019, in the Korean Intellectual Property Office, the disclosures of which are herein incorporated by reference in their entireties.

BACKGROUND

Technical Field

The disclosure relates to a charging electronic devices, and more particularly, to a charger device in which multiple devices can be seated and charged wirelessly simultaneously.

Description of Related Art

Recently, portable electronic devices are become more widespread to developments within the electronic communication industry. For example, portable electronic devices now include a variety of electronic devices which can be freely used while moving without geographic limitation, such as personal digital assistants (PDA), smart phones, tablet PCs, MP3 players, laptop personal computers (PC), digital cameras and wearable devices, in addition to mobile communication terminals for communication.

An electronic device typically includes a battery. Portability of the device is facilitated by the charge stored by the battery. Electronic devices are typically charged using wired connectors of a charging terminal. Furthermore, wireless charging using a wireless charging device having a loop coil has recently become more widespread and popular.

SUMMARY

An electronic device may be connected and charged by a charging device using a wired or wireless connection. If the electronic device is charged by a charging device over a wired connection, user inconvenience is increased due to the need to connect the electronic device and the charging device physically through cabling. Further, a problem often arises in that the connector is damaged due to the frequent insertion and removal of the charging connector.

However, in wireless charging solutions, a problem arises in that charging efficiency for wireless charging is lower than for that of wired charging, and furthermore, an excess generation of heat can damage the electronic device.

An electronic device according to certain embodiments includes a plurality of wireless charging antennas, a plurality of shielding partition layers, at least some of the plurality of shielding partition layers disposed between the plurality of wireless charging antennas, a plurality of external device-receiving grooves formed through spaces defined between pairs of the shielding partition layers, and a processor electrically coupled to the plurality of wireless charging antennas, wherein the processor is configured to: determine whether at least one external device is inserted into at least one of the plurality of external device-receiving grooves, and when the at least one external device is inserted into the at least one of the plurality of external device-receiving grooves, wirelessly transmit power through at least one wireless charging antenna corresponding to the at least one of the plurality of external device-receiving grooves into which the at least one external device is inserted.

An electronic device according to certain embodiments includes a battery, a housing including a first face in which a display or a user input device is positioned, a second face oriented towards a direction opposite the first face, and a third face disposed between the first face and the second face, a wireless charging antenna disposed in an area within the housing corresponding to at least a portion of the third face, and a processor configured to enable wireless reception of power to the battery through the wireless charging antenna.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, embodiments of the disclosure will be described in detail with reference to accompanying drawings.

Figure 1:
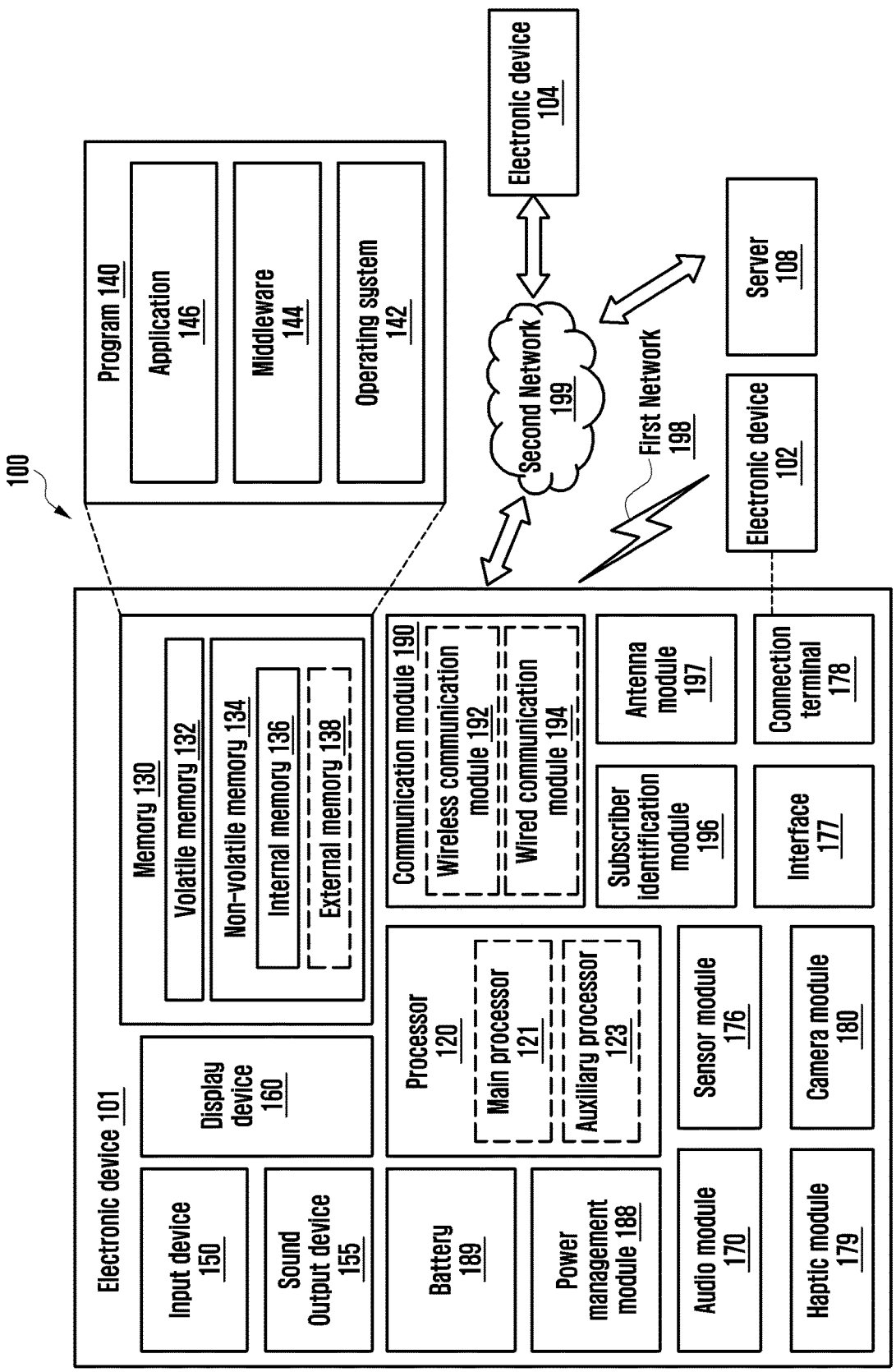
FIG. 1 is a block diagram of an electronic device 101 within a network environment 100 according to certain embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
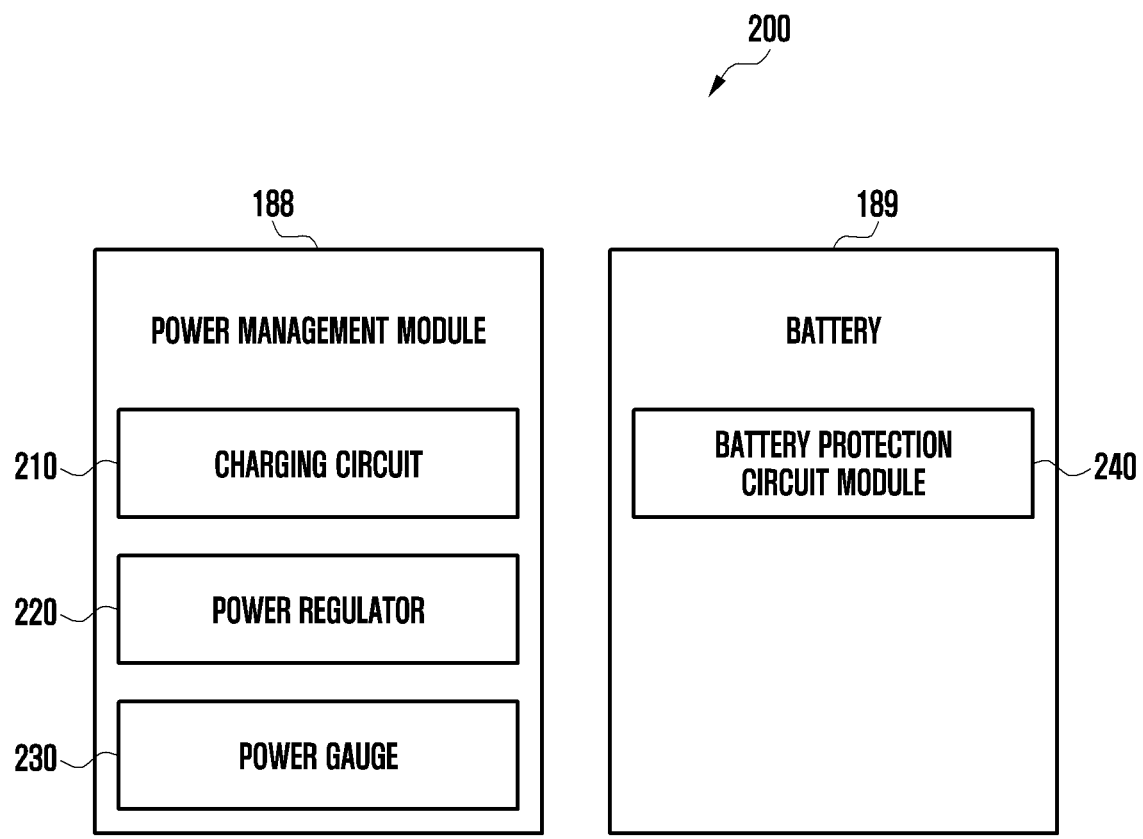
FIG. 2 is a block diagram of a power management module and a battery according to certain embodiments.

FIG. 2 is a block diagram 200 of the power management module 188 and the battery 189 according to certain embodiments. Referring to FIG. 2, the power management module 188 may include a charging circuit 210, a power regulator 220 or a power gauge 230. The charging circuit 210 may charge the battery 189 using power supplied from an external power source for the electronic device 101. According to an embodiment, the charging circuit 210 may select a charging method (e.g., normal charging or quick charging) based on at least some of the type of external power source (e.g., power adaptor, USB or wireless charging), the amount of power (e.g., about 20 Watt or more) which may be supplied from an external power source or the attributes of the battery 189, and may charge the battery 189 using the selected charging method. The external power source may be connected to the electronic device 101 through the connection terminal 178 over wires or may be wirelessly connected to the electronic device 101 through the antenna module 197, for example.

The power regulator 220 may generate a plurality of pieces of power having different voltages and/or current levels by regulating a voltage level and/or current level of power supplied from the external power source or the battery 189, for example. The power regulator 220 may regulate power of the external power source or the battery 189 to a voltage and/or current level suitable for each of some of elements included in the electronic device 101. According to an embodiment, the power regulator 220 may be implemented in the form of a low drop out (LDO) regulator or switching regulator. The power gauge 230 may measure use state information (e.g., at least one of the capacity, charge/discharge number, voltage or temperature of the battery 189) for the battery 189.

The power management module 188 may determine charge state information (e.g., lifespan, overvoltage, low voltage, overcurrent, over charge, over discharge, overheating, short-circuit or swelling) related to the charging of the battery 189 based on at least some of the measured use state information using the charging circuit 210, the power regulator 220 or the power gauge 230, for example. The power management module 188 may determine whether the battery 189 is normal or abnormal based on at least some of the determined charge state information. If the state of the battery 189 is determined to be abnormal, the power management module 188 may control (e.g., a charge current or a voltage drop or charge stop) the charging of the battery 189. According to an embodiment, at least some of the functions of the power management module 188 may be performed by an external controller (e.g., the processor 120).

According to an embodiment, the battery 189 may include a battery protection circuit module (PCM) 240. The battery PCM 240 may perform one or more various functions (e.g., pre-blocking function) for preventing performance degradation or burning of the battery 189. The battery PCM 240 may be configured as at least some of a battery management system (BMS) capable of performing various functions including at least one of cell balancing, and capacity measurement, charge/discharge number measurement, temperature measurement or voltage measurement for the battery additionally or alternatively.

According to an embodiment, at least some of the use state information or charge state information of the battery 189 may be measured using a corresponding sensor (e.g., temperature sensor) of the sensor module 176, the power gauge 230 or the power management module 188. According to an embodiment, the corresponding sensor (e.g., temperature sensor) of the sensor module 176 may be included as a part of the battery PCM 240 or may be positioned near the battery 189 as a separate device.

Figure 3:
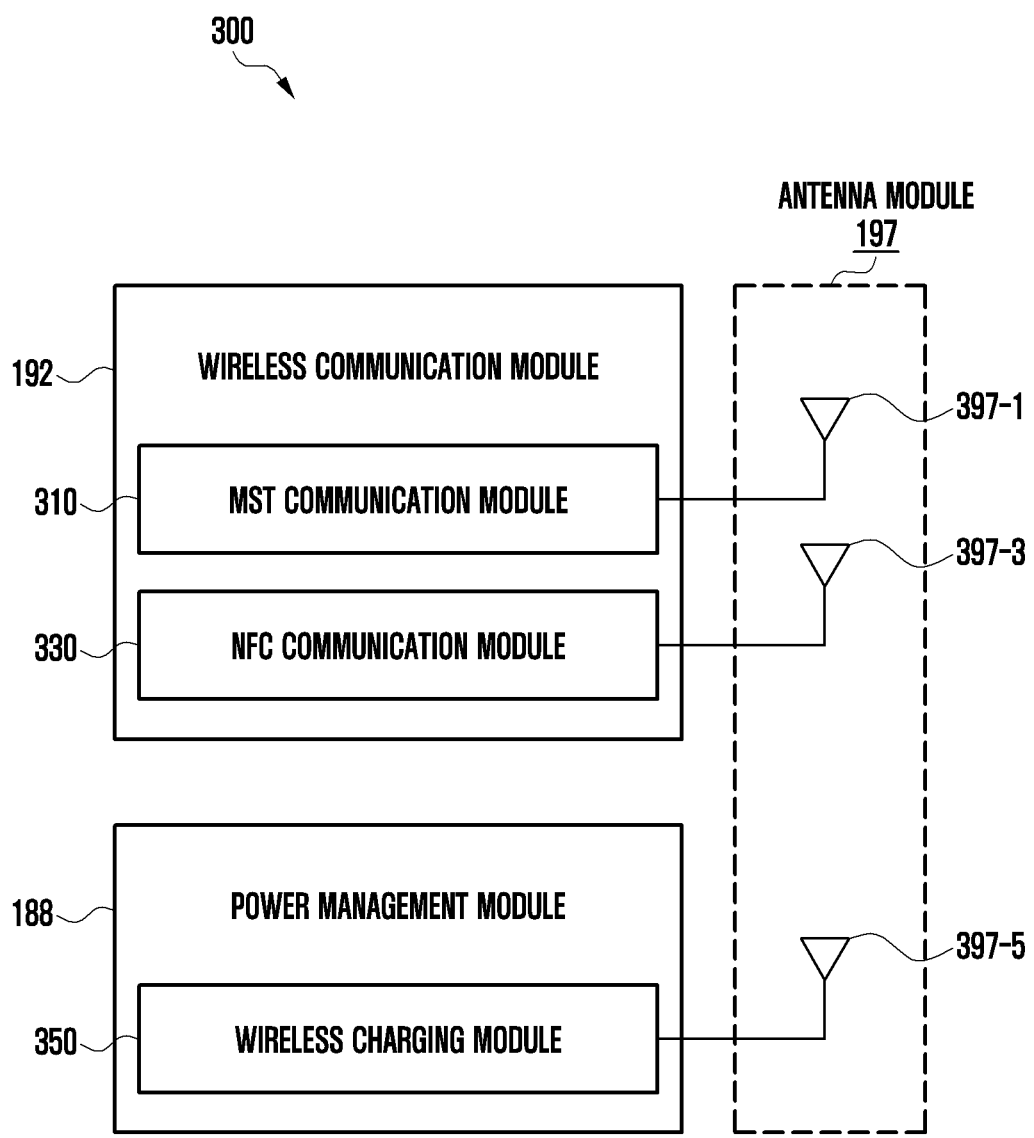
FIG. 3 is a block diagram of the wireless communication module, power management module, and antenna module of the electronic device according to certain embodiments.

FIG. 3 is a block diagram 300 of the wireless communication module 192, power management module 188 and antenna module 197 of the electronic device 101 according to certain embodiments. Referring to FIG. 3, the wireless communication module 192 may include an MST communication module 310 and/or an NFC communication module 330. The power management module 188 may include a wireless charging module 350. In such a case, the antenna module 197 may include a plurality of antennas, including an MST antenna 397-1 connected to the MST communication module 310, an NFC antenna 397-3 connected to the NFC communication module 330, and a wireless charging antenna 397-5 connected to the wireless charging module 350. It is noted that some elements may have already been described in conjunction with FIG. 1, and is therefore omitted or described generally to avoid redundancy in the interests of brevity.

The MST communication module 310 may receive a signal including control information or settlement information, such as card information, from the processor 120, generate a magnetic signal corresponding to a signal received through the MST antenna 397-1, and transmit the generated magnetic signal to the external electronic device 102 (e.g., POS device). In order to generate the magnetic signal, according to an embodiment, the MST communication module 310 may include a switching module (not illustrated) including one or more switches connected to the MST antenna 397-1, and may change the direction of a voltage or current supplied to the MST antenna 397-1 in response to the received signal by controlling the switching module. A change in the direction of the voltage or current enables a change of the direction of a magnetic signal (e.g., magnetic field) transmitted through the MST antenna 397-1. A magnetic signal whose direction is changed may cause an effect (e.g., waveform) similar to that of a magnetic field that is generated when a magnetic card corresponding to the received signal (e.g., card information) is received via swipe by a card reader of the electronic device 102, when the magnetic signal is detected in the external electronic device 102. According to an embodiment, settlement-related information and a control signal received from the electronic device 102 in the form of the magnetic signal may be transmitted to the external server 108 (e.g., settlement server) over the second network 199, for example.

The NFC communication module 330 may obtain a signal including control information or settlement information, such as card information, from the processor 120, and may transmit the obtained signal to the external electronic device 102 through the NFC antenna 397-3. According to an embodiment, the NFC communication module 330 may receive such a signal, transmitted by the external electronic device 102, through the NFC antenna 397-3.

The wireless charging module 350 may wirelessly transmit power to the external electronic device 102 (e.g., mobile phone or wearable device) or wirelessly receive power from the external electronic device 102 (e.g., wireless charging device) through the wireless charging antenna 397-5. The wireless charging module 350 may support one or more wireless charging methods including a magnetic resonance method, or a magnetic induction method, for example.

According to an embodiment, some of the MST antenna 397-1, the NFC antenna 397-3 or the wireless charging antenna 397-5 may share at least some of a radiation part (e.g., a radiating portion or part). For example, the radiation part of the MST antenna 397-1 may be used as the radiator of the NFC antenna 397-3 or the wireless charging antenna 397-5, and vice versa. In such a case, the antenna module 397 may include a switching circuit (not illustrated) configured to selectively connect (e.g., close) or disconnect (e.g., open) at least some of the antennas 397-1, 397-3 or 397-5, under the control of the wireless communication module 192 (e.g., the MST communication module 310 or the NFC communication module 330) or the power management module 188 (e.g., the wireless charging module 350). For example, if the electronic device 101 uses a wireless charging function, the NFC communication module 330 or the wireless charging module 350 may temporarily separate at least some area of the radiation part, shared by the NFC antenna 397-3 and the wireless charging antenna 397-5, from the NFC antenna 397-3 and connect the at least some area of the radiation part to the wireless charging antenna 397-5 by controlling the switching circuit.

According to an embodiment, the function of at least one of the MST communication module 310, the NFC communication module 330 or the wireless charging module 350 may be controlled by an external processor (e.g., the processor 120). According to an embodiment, designated functions (e.g., payment functions) of the MST communication module 310 or the NFC communication module 330 may be performed in a trusted execution environment (TEE). The TEE according to certain embodiments may form an execution environment to which at least some designated area of the memory 130 is assigned in order for the TEE to be used in performing a function that utilizes a relatively high level of security (e.g., a function related to financial transactions or personal information), for example. In such a case, access to the designated area may be limitedly permitted depending on the subject that accesses the area or an application executed in the TEE, for example.

Figure 4A:
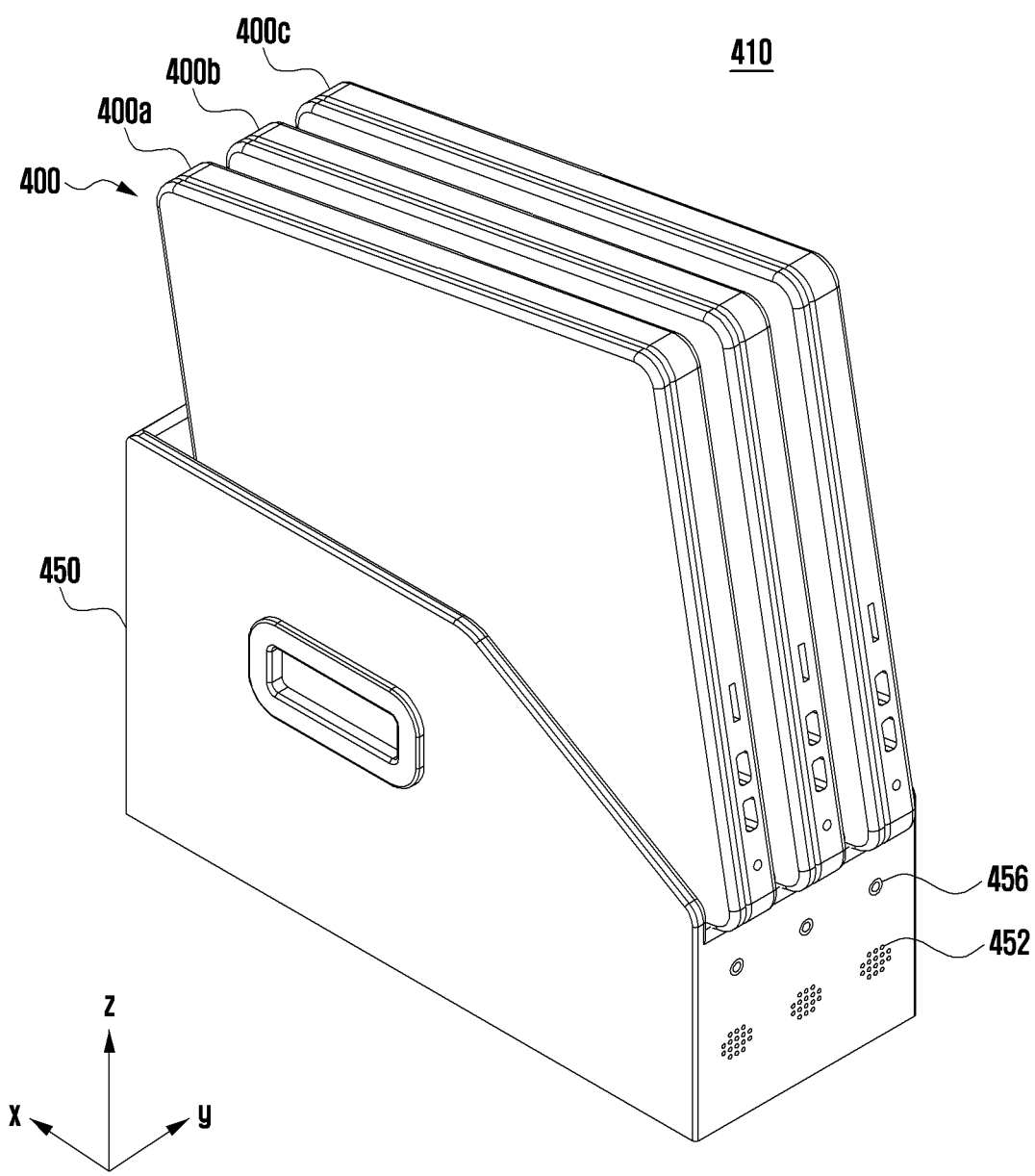
FIG. 4A is a diagram illustrating a wireless charging environment 410 of an electronic device 400 according to certain embodiments of the disclosure.

FIG. 4A is a diagram illustrating a wireless charging environment 410 of an electronic device 400 according to certain embodiments of the disclosure.

Referring to FIG. 4A, the electronic device 400 (e.g., the electronic device 101 in FIG. 1) according to certain embodiments may wirelessly receive power through a wireless charging device 450 (e.g., the electronic device 102 in FIG. 1). That is, the electronic device 400 supports wireless charging, and may receive wireless charging of the battery through the wireless charging device 450.

For example, the wireless charging device 450 according to certain embodiments may support wireless charging for one or more electronic devices 400. For example, the wireless charging device 450 may identify the electronic device 400 inserted into a receiving groove that receives the external electronic device 400, and may wirelessly transmit power to the inserted one or more electronic devices 400. The wireless charging device 450 according to certain embodiments may support a wireless charging function that can simultaneously charge two or more electronic devices 400a, 400b, and 400c at any given time.

For example, the wireless charging device 450 may receive a power source (or power) from an exterior using a power adaptor (not illustrated), and may wirelessly transmit power to the electronic device 400 through a wireless charging antenna positioned at the base of a receiving groove area into which the electronic device 400 may be inserted using the received power source (or power).

According to certain embodiments, the wireless charging device 450 may include one or more external device-receiving grooves into which two or more electronic devices 400a, 400b, and 400c may be inserted.

As illustrated in FIG. 4A, one or more electronic devices 400 may be inserted and disposed so that one side thereof is directed toward the interior of the external device-receiving groove of the wireless charging device 450. Although not illustrated in FIG. 4A, the external device-receiving groove of the wireless charging device 450 may be separated by one or more partitions, so that the one or more electronic devices 400a, 400b, and 400c are separated when inserted into the external device-receiving grooves, respectively.

For example, each of the one or more electronic devices 400a, 400b, and 400c which may be inserted into the wireless charging device 450 and wirelessly charged may include a wireless charging antenna (second wireless charging antenna) for wirelessly receiving power on one side thereof that is oriented towards the external device-receiving groove, when the electronic device is inserted into the wireless charging device 450. For example, each of the one or more electronic devices 400a, 400b, and 400c may include at least one of a laptop PC, a table PC or a portable terminal.

According to certain embodiments, the wireless charging device 450 may determine whether at least one electronic device 400 has been inserted into the receiving groove of the wireless charging device 450, and may provide information relevant to charging of the electronic device 400 through a display unit 456 (e.g., LED) (e.g., the display 160 in FIG. 1) disposed on one side of the wireless charging device 450.

For example, when at least one electronic device 400 is inserted, the wireless charging device 450 may receive information related to the charging of the electronic device 400 through wireless communication (e.g., short distance wireless communication such as Bluetooth) with the inserted electronic device 400, and may output the information related to the charging through the display unit 456. For example, when a first external electronic device 400a is inserted into a specific external device-receiving groove of a plurality of external device-receiving groove areas, the wireless charging device 450 may output information on whether the first external electronic device 400a has been inserted and/or charge state information (e.g., a charge level) of the first external electronic device 400a through a specific display unit that corresponds to the groove into which the first external electronic device 400a has been inserted. For example, the wireless charging device 450 may output charge state information to an exterior in such a way as to output red light through the display unit 456 while wireless charging is performed after the electronic device 400 is inserted and to output green light through the display unit 456 when the charging of the electronic device 400 is completed.

The wireless charging device 450 according to certain embodiments may further define air vents 452 in at least a side of a housing. For example, at least some of heat generated within the housing of the wireless charging device 450 may be discharged through the air vents 452.

Figure 4B:
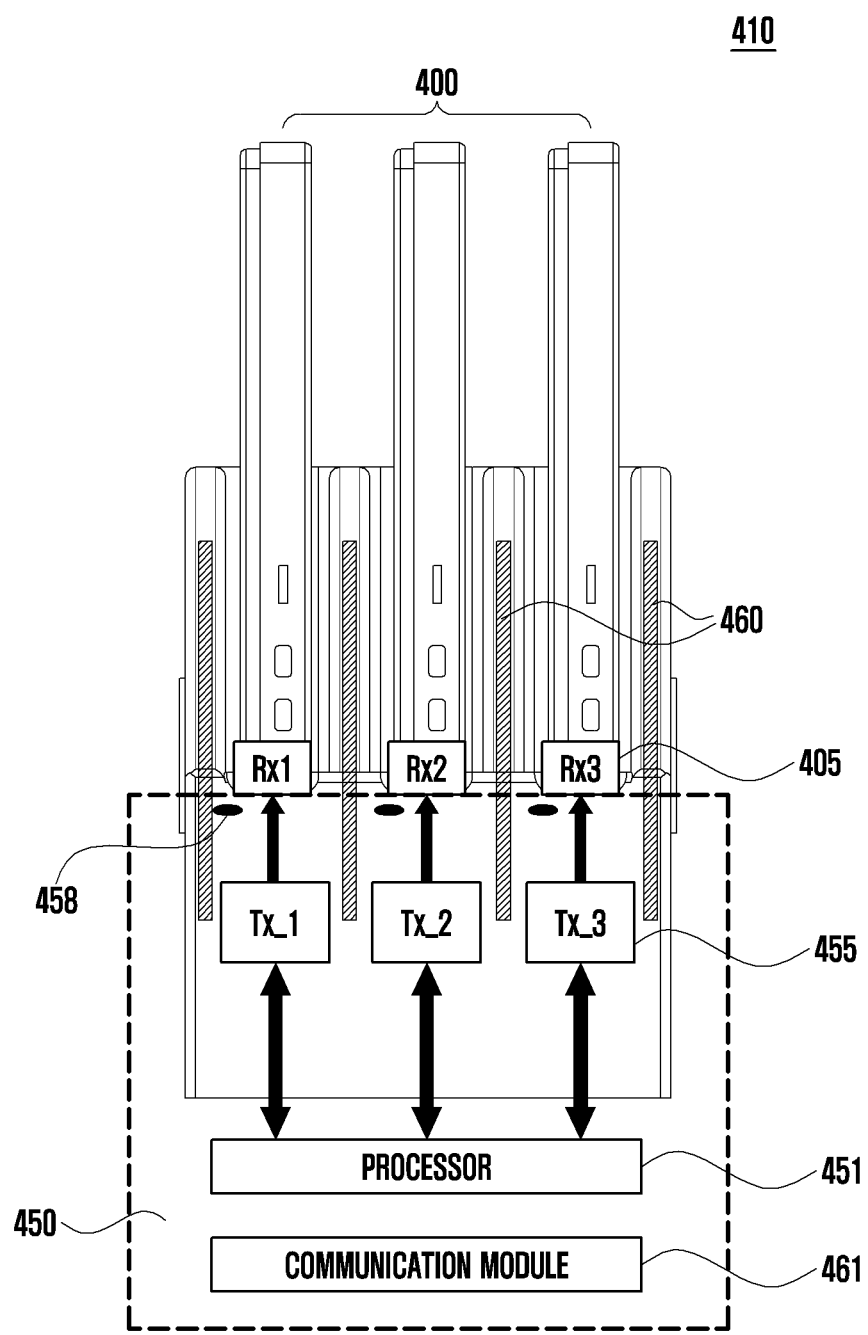
FIG. 4B is a diagram illustrating a wireless charging environment 410 of the electronic device 400 according to certain embodiments of the disclosure.

FIG. 4B is a diagram illustrating a wireless charging environment 410 of the electronic device 400 according to certain embodiments of the disclosure.

FIG. 4B is a block diagram of a configuration schematically illustrating a cross section of the wireless charging environment 410 in FIG. 4A, for example, which is viewed in the x-axis direction.

The wireless charging device 450 according to certain embodiments may provide a function for wirelessly charging a plurality of electronic devices 400 at the same time.

Referring to FIG. 4B, the wireless charging device 450 according to certain embodiments may include a plurality of wireless charging antennas 455 (e.g., Tx_1, Tx_2, and Tx_3).

For example, the wireless charging antenna 455 (e.g., the wireless charging antenna 397-5 in FIG. 3) may wirelessly transmit power to the external electronic device 400 under the control of a processor 451 (e.g., the processor 120 in FIG. 1) or a wireless charging module (e.g., the wireless charging module 350 in FIG. 3).

According to certain embodiments, the wireless charging device 450 may include one or more shielding partition layers 460 at least some of which may be disposed between the plurality of wireless charging antennas 455. For example, the shielding partition layer 460 may be along an exterior of the housing of the wireless charging antennas 455, and/or disposed in an area set between locations where the plurality of wireless charging antennas 455 (e.g., Tx_1, Tx_2, and Tx_3) are disposed. For example, each of the wireless charging antennas 455 may be disposed between the shielding partition layers 460.

For example, the shielding partition layer 460 may include a shielding material for blocking interference from signals transmitted by the wireless charging antennas 455.

The wireless charging device 450 may include a plurality of external device-receiving grooves into which the plurality of electronic devices 400 may be inserted, for example. For example, the external device-receiving grooves may be formed through the spaces between the shielding partition layers 460. For example, the external device-receiving groove may indicate a space that is formed at a first side of the housing of the wireless charging device 450, that corresponds to an area where two shielding partition layers 460 and a specific wireless charging antenna 455 between the two shielding partition layers 460 are disposed.

Each of the electronic devices 400 may be inserted into one external device-receiving groove of the wireless charging device 450 according to certain embodiments, and may be wirelessly charged while inserted therein. For example, the inserted electronic device 400 may have second wireless charging antennas 405 (Rx_1, Rx_2, and Rx_3) disposed on one side of the electronic device 400 oriented towards the receiving grooves of the wireless charging device 450, respectively.

The wireless charging device 450 according to certain embodiments may identify that the electronic devices 400 are inserted into the external device-receiving grooves separated by the shielding partition layers 460, respectively, and may wirelessly transmit power to the electronic devices 400 through transmitter antennas (e.g., the wireless charging antennas 455) (Tx_1, Tx_2, and Tx_3) corresponding to the inserted receiving grooves. For example, the inserted electronic devices 400 may wirelessly receive power through receiver antennas (e.g., the second wireless charging antennas 405) (Rx_1, Rx_2, and Rx_3) included in the inserted electronic device 400, and may charge the batteries (e.g., the battery 189 in FIG. 1) of the electronic devices 400.

For example, the processor 451 of the wireless charging device 450 may control a wireless charging antenna 455 so that a power signal is output by a specific wireless charging antenna 455 corresponding to the external device-receiving groove into which the electronic device 400 has been inserted. For example, if it is determined that the electronic devices 400 have been inserted into a first receiving groove and a second receiving groove, respectively, the processor 451 may control to wirelessly transmit power through a wireless charging antenna 455 (Tx_1) corresponding to the first receiving groove and a wireless charging antenna 455 (Tx_3) corresponding to the second receiving groove, respectively.

The wireless charging device 450 according to certain embodiments includes the shielding partition layer 460 between the wireless charging antennas 455 (Tx_1, Tx_2, and Tx_3) (or the second wireless charging antennas 405 (Rx_1, Rx_2, and Rx_3), thus being capable of minimizing interference between the signals of the antennas.

According to certain embodiments, each of the wireless charging antennas 455 (Tx_1, Tx_2, and Tx_3) of the wireless charging device 450 and the second wireless charging antennas 405 (Rx_1, Rx_2, and Rx_3) of the electronic device 400 may include a solenoid coil so that smooth wireless charging is performed although in some embodiments, one side of each of the wireless charging antennas 455 and one side of each of the second wireless charging antennas 405 come into contact with each other (e.g., there are no multiple contacts). According to certain embodiments, each of the wireless charging device 450 and the electronic device 400 capable of being wirelessly charged through the wireless charging device 450 includes a solenoid coil not a loop coil substantially positioned in one plane. Accordingly, efficient wireless charging can be performed although a contact area between the electronic device 400 and the wireless charging device 450 is small.

According to certain embodiments, the wireless charging device 450 may include a communication module 461 (e.g., the communication module 190 in FIG. 1).

According to an embodiment, the processor 451 of the wireless charging device 450 may determine whether the electronic device 400 has been inserted into at least one of a plurality of external device-receiving grooves, and may exchange information related to charging with the inserted at least one electronic device 400 using the communication module 461. For example, the wireless charging device 450 may receive, from the electronic device 400, at least one of battery use state information (e.g., information related to at least one of the capacity, charge/discharge number, voltage or temperature of the battery) or charge state information (e.g., information related to lifespan, an overvoltage, a low voltage, an overcurrent, overcharging or over discharge, overheating, short-circuit or swelling) of the inserted electronic device 400 through the communication module 461. For example, the wireless charging device 450 may receive, from the electronic device 400, information on an expected consumption time up to the full charging of the battery of the electronic device 400 through the communication module 461.

According to certain embodiments, the wireless charging device 450 may control wirelessly transmitted power based on information on the charging of the electronic device 400 obtained through the communication module 461.

According to another embodiment, the processor 451 of the wireless charging device 450 may control the communication module 461 to transmit or receive data or a command to and from a second electronic device (not illustrated).

For example, the wireless charging device 450 may transmit, to an external second electronic device (not illustrated), at least one of information on whether the electronic device 400 has been inserted, determined by the processor 451, or charging-related information received from the electronic device 400 using the communication module 461. For example, the wireless charging device 450 may receive a control command from a second electronic device (not illustrated) using the communication module 461, and may control wirelessly transmitted power through the wireless charging antenna 455 based on the control command. For example, a second electronic device (not illustrated) may obtain information on the charge state of the electronic device 400 inserted into the wireless charging device 450 based on information received from the wireless charging device 450. For example, a second electronic device (not illustrated) may assign priority related to charging to a specific electronic device 400 of a plurality of electronic devices 400 inserted into the wireless charging device 450 or may differently set transmission power intensity for the specific electronic device 400. For example, the wireless charging device 450 may differently control the charge time, charge sequence or charge intensity of an inserted electronic device 400 based on a control command received from a second electronic device (not illustrated).

The wireless charging device 450 according to certain embodiments may further include a magnetic body 458 in each of the external device-receiving grooves. For example, each of the magnetic bodies 458 that correspond to respective external device-receiving grooves and that are positioned in an area inside the housing of the wireless charging device 450 may arrange the location into which the electronic device 400 inserted into the external device-receiving groove is inserted by generating magnetism that attracts the electronic device 400.

For example, the magnetic body 458 included in the wireless charging device 450 may include a permanent-electro magnet. For example, the processor 451 of the wireless charging device 450 is electrically connected to a permanent-electro magnet, and may control the magnetism of the permanent-electro magnet based on a charge state of the electronic device 400. According to an embodiment, if it is determined that the charging of an inserted electronic device 400 is completed, the wireless charging device 450 may control to not generate magnetism for the electronic device 400 by applying a designated current to a corresponding permanent-electro magnet.

According to another embodiment, a heat pipe may be positioned in an area (e.g., an area corresponding to the location 458 in FIG. 4B) inside the housing of the wireless charging device 450 corresponding to an external device-receiving groove. For example, in the wireless charging device 450, the heat pipe may be positioned in an area adjacent to the wireless charging antenna 455 (or the second wireless charging antenna 405) so that at least some of heat generated by power transmission or reception is absorbed by the heat pipe.

In the present disclosure, the number of electronic devices 400 capable of being charged through the wireless charging device 450 at the same time has been illustrated as being three in FIG. 4A or 4B. However, the wireless charging device 450 according to certain embodiments may be configured to support the wireless charging of one electronic device 400 or may be configured to wirelessly charge two or four or more electronic devices 400 at the same time.

Figure 4C:
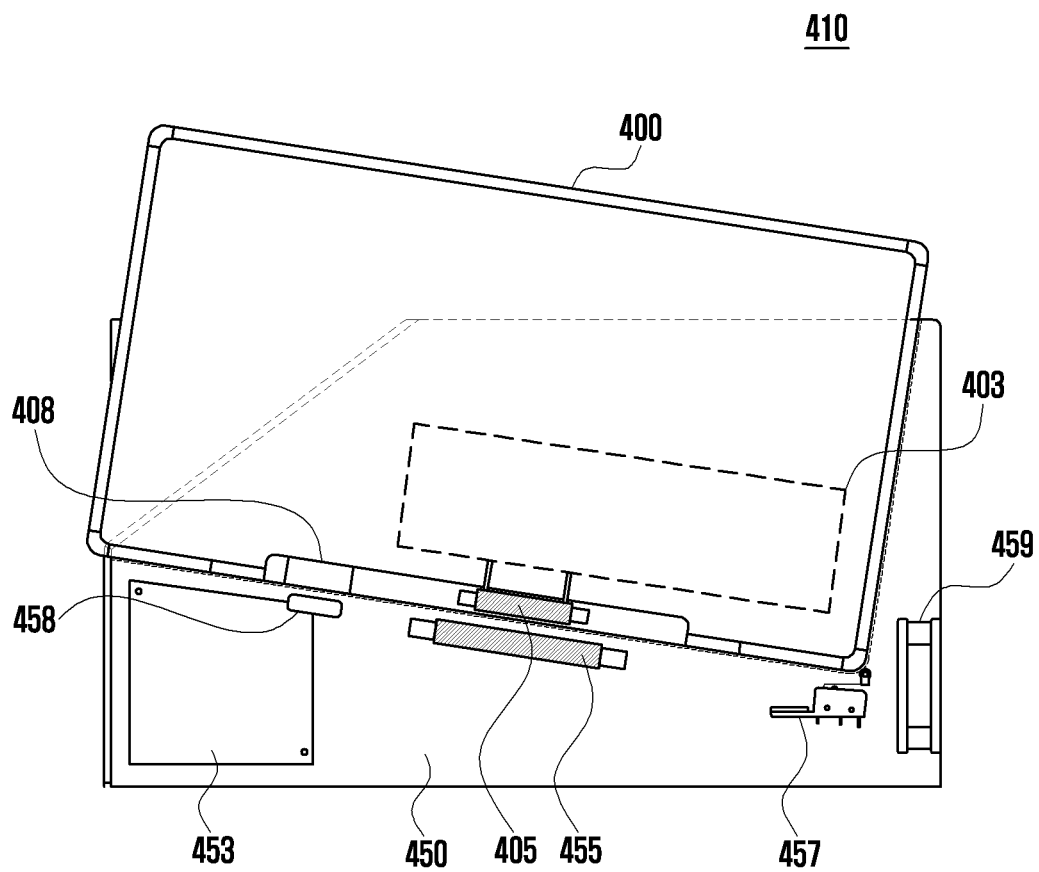
FIGS. 4C and 4D are diagrams illustrating wireless charging environments 410 of the electronic device 400 according to certain embodiments of the disclosure.
Figure 4D:
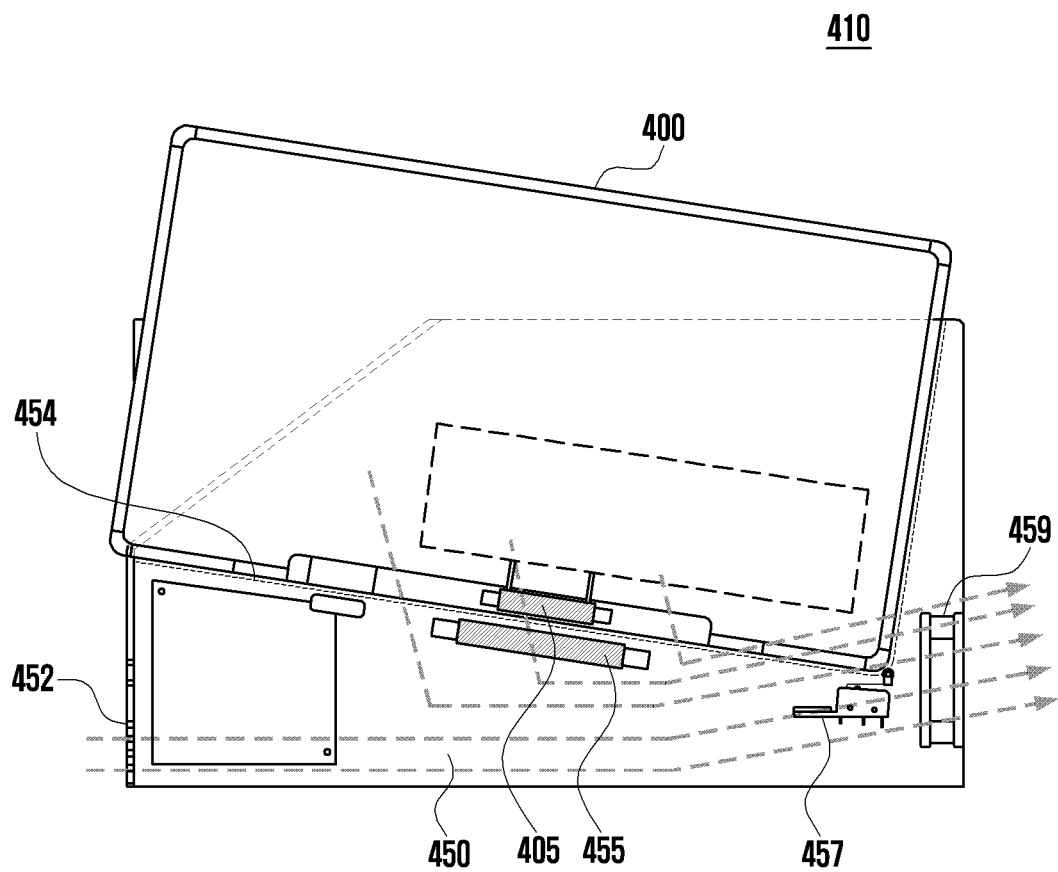

FIGS. 4C and 4D are diagrams illustrating wireless charging environments 410 of the electronic device 400 according to certain embodiments of the disclosure.

For example, FIGS. 4C and 4D are diagrams schematically illustrating cross sections of the wireless charging environment 410 in FIG. 4A, which are viewed in the y-axis direction.

Referring to FIG. 4C, at least one electronic device 400 positioned in the wireless charging device 450 according to certain embodiments may be inserted into the receiving groove of the wireless charging device 450 so that at least some of the electronic device 400 is inclined with respect to a base of the wireless charging device 450. For example, the housing of the wireless charging device 450 may be configured so that the tilt angle of the inserted electronic device 400 is substantially 5° to 10° (e.g., 7°) with respect to the base of the wireless charging device 450.

According to certain embodiments, a transmitter antenna (e.g., wireless charging antenna) 455 may be positioned inside the housing of the wireless charging device 450 at the base of an external device-receiving groove into which the electronic device 400 is inserted. A receiver antenna (e.g., second wireless charging antenna) 405 may be positioned on one side of the electronic device 400 inserted into the external device-receiving groove.

For example, as illustrated in FIG. 4C, the location of the transmitter antenna (e.g., wireless charging antenna) 455 of the wireless charging device 450 and the location of the receiver antenna (e.g., second wireless charging antenna) 405 of the electronic device 400 may be positioned such that they correspond (e.g., are proximate to one another).

According to certain embodiments, in order to ensure the positioning of the transmitter antenna 455 and the receiver antenna 405 when the device 400 is inserted, the wireless charging device 450 and the electronic device 400 may further include the magnetic bodies 458 and 408, respectively. For example, the magnetic body 458 may be positioned in the wireless charging device 450 and include a permanent-electro magnet whose magnetism may be controlled based on the application of a current. The second magnetic body 408 positioned in the electronic device 400 may also include a permanent magnet. According to another example, the magnetic body 458 of the wireless charging device 450 may include a permanent magnet. The magnetic body 408 of the electronic device 400 may include a permanent-electro magnet. The mutual attraction between the magnetic bodies 408 and 458 may help enable correct seating of the device 400.

According to certain embodiments, the wireless charging device 450 or the electronic device 400 may control the magnetism of the magnetic bodies 458 and 408 based on a charge state of the electronic device 400. For example, if it is determined that the charging of the electronic device 400 is completed, the wireless charging device 450 or the electronic device 400 may remove magnetism by applying a current to the permanent-electro magnet included in the magnetic bodies 458 and 408 so that a user can intuitively recognize a charging completion state.

According to certain embodiments, the wireless charging device 450 may further include a switching unit 457 for determining the insertion of the electronic device 400. For example, the processor 451 mounted on a PCB 453 electrically connected to the switching unit 457 may identify that the switching unit 457 is pressurized when the electronic device 400 is inserted into the wireless charging device 450, and may determine that the electronic device 400 is inserted into the location of a specific receiving groove.

According to certain embodiments, the processor 451 of the wireless charging device 450 may wirelessly transmit power through a transmitter antenna (e.g., wireless charging antenna) 455 corresponding to the location of a receiving groove into which electronic device 400 is inserted based on a determination of the insertion of the electronic device 400.

For example, the electronic device 400 may receive power transmitted by the wireless charging device 450 through a receiver antenna (e.g., second wireless charging antenna) 405. For example, the processor (or a PCB on which the processor is mounted) 403 electrically connected to the receiver antenna 405 of the electronic device 400 may permit charging of the battery of the electronic device 400 using the received power.

Referring to FIGS. 4C and 4D, the wireless charging device 450 according to certain embodiments may further include a cooling fan 459 on a side of the housing.

As illustrated in FIG. 4D, the wireless charging device 450 according to certain embodiments may include air vents 452 and 454 in at least one side of the housing on which the processor 451 (or the PCB 453 on which the processor is mounted) and the wireless charging antenna 455 are mounted. For example, one side of the housing including the air vents may include one side 452 of the wireless charging device 450 (e.g., one side of the wireless charging device 450 viewed in the x-axis direction in FIG. 4A). For another example, one side of the housing including the air vents may include one side 454 of the housing corresponding to an external device-receiving groove into which the electronic device 400 may be inserted.

According to certain embodiments, the cooling fan 459 of the wireless charging device 450 may be positioned on the other side of the housing opposite one side 452 of the housing including the air vents.

For example, the wireless charging device 450 may receive air from the air vents 452 and 454 when the cooling fan 459 is driven, and may cause air to flow via the cooling fan 459 so that heat generated by wireless charging is discharged to an exterior.

The processor 451 of the wireless charging device 450 according to certain embodiments may receive information on a temperature of the electronic device 400 from the electronic device 400 through the communication module 461. For example, the electronic device 400 may obtain information on a temperature of an electronic device using a temperature sensor (e.g., the sensor module 276 in FIG. 1) or the power gauge (e.g., the power gauge 230 in FIG. 2) of a power management module (e.g., the power management module 188 in FIG. 1), and may transmit the temperature information to the wireless charging device 450. According to certain embodiments, the processor 451 of the wireless charging device 450 may control the driving of the cooling fan 459 based on the temperature information of the electronic device 400.

Figure 5A:
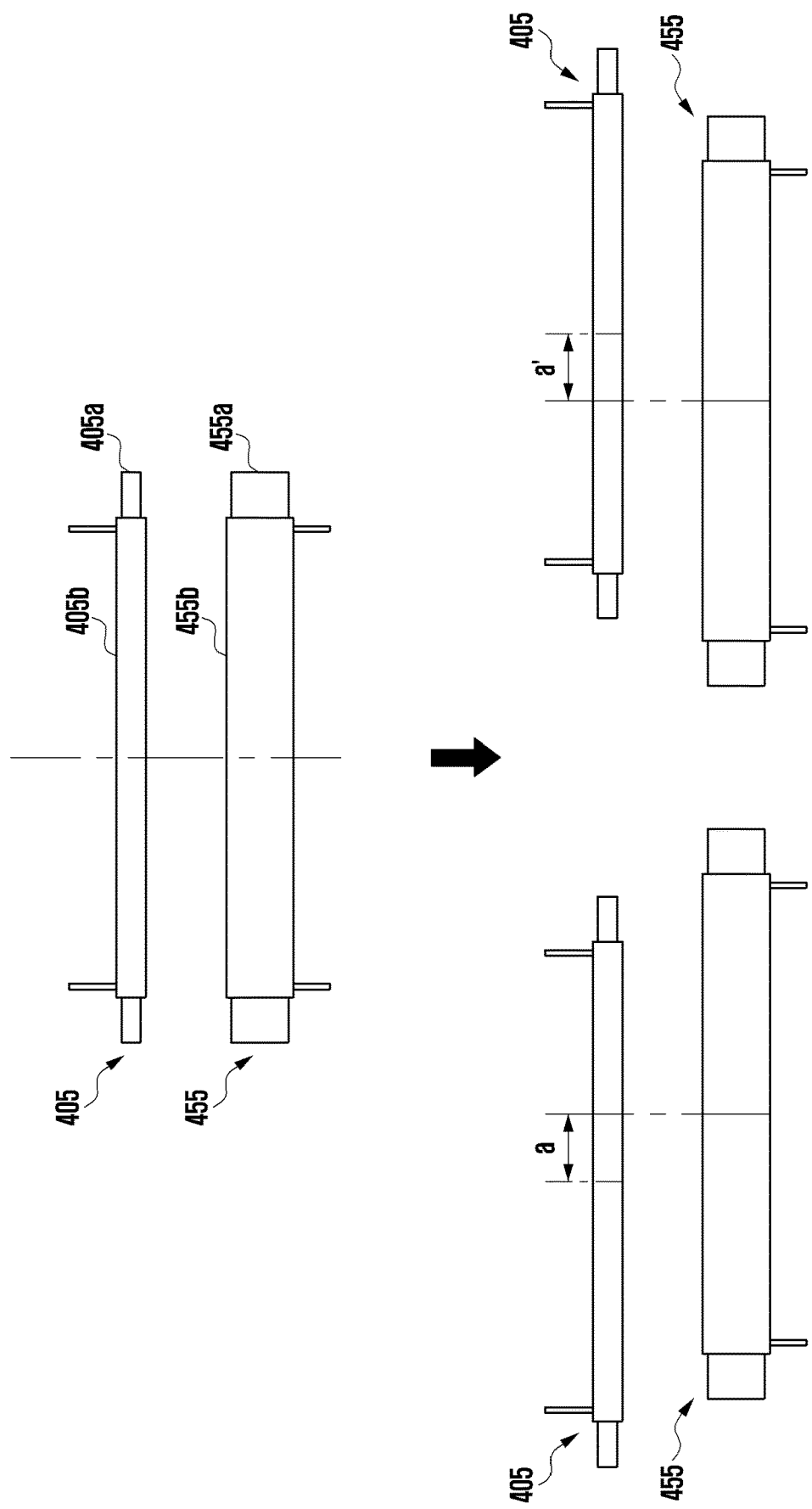
FIGS. 5A and 5B are diagrams describing the locations where wireless charging antennas are positioned according to certain embodiments of the disclosure.
Figure 5B:
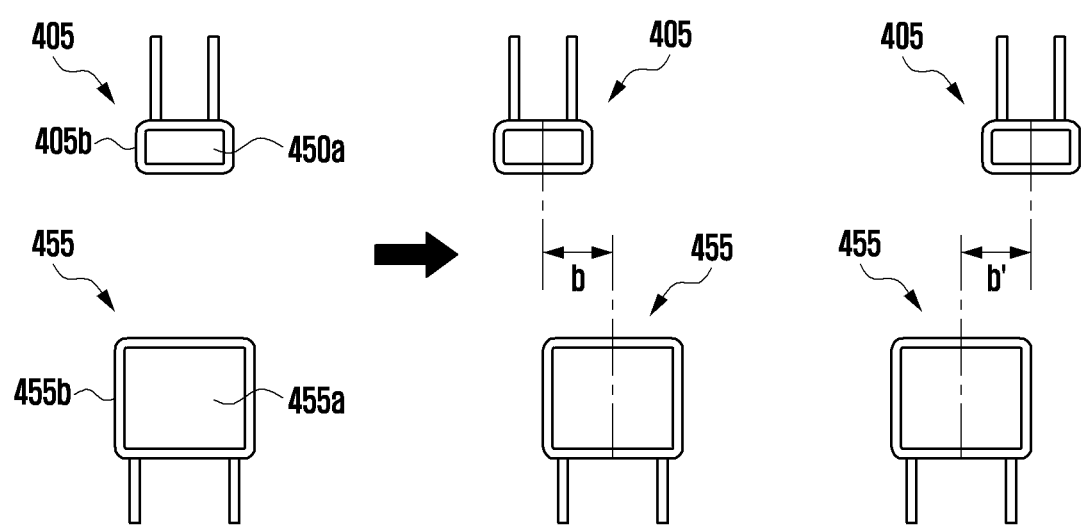

FIGS. 5A and 5B are diagrams describing the locations where wireless charging antennas are positioned according to certain embodiments of the disclosure.

According to certain embodiments, the transmitter antenna 455 positioned in the wireless charging device 450 and the receiver antenna 405 positioned in the electronic device 400 may wirelessly transmit or receive a power signal.

As illustrated in FIGS. 5A and 5B, according to certain embodiments, each of the transmitter antenna 455 of the wireless charging device 450 and the receiver antenna 405 of the electronic device 400 may include a solenoid coil.

For example, the transmitter antenna 455 may include a ferrite core 455a and a solenoid coil 455b spirally wound on the ferrite core 455a. For example, the receiver antenna 405 may include a ferrite core 405a and a solenoid coil 405b spirally wound on the ferrite core 405a.

According to certain embodiments, although the transmitter antenna 455 and the receiver antenna 405 may be spaced apart, they may wirelessly transmit or receive power. For example, an interval between the transmitter antenna 455 and the receiver antenna 405 may be 5 mm to 10 mm.

Referring to FIG. 5A, although the center of the axis of the transmitter antenna 455 or the receiver antenna 405 according to certain embodiments is at least partially moved to a left a or right a' with respect to the center of each of the ferrite cores 405a and 455a on which the respective solenoid coils 405b and 455b are wound in a long-axis direction, wireless charging can still be smoothly performed. For example, although the center of the receiver antenna 405 in the long-axis direction is moved to the left "a" or the right "a'" by 10 mm or less with respect to the center of the transmitter antenna 455 in the long-axis direction, both the antennas 455 and 405 can wirelessly transmit or receive power with designated power intensity.

Referring to FIG. 5B, although the center of the axis of the transmitter antenna 455 or the receiver antenna 405 according to certain embodiments is at least partially moved to a left "b" or right "b'" with respect to the center of each of the ferrite cores 405a and 455a on which the respective solenoid coils 405b and 455b are wound in a short-axis direction, wireless charging can still be smoothly performed. For example, although the center of the receiver antenna 405 in the short-axis direction is moved to the left "b" or the right "b'" by 4 mm or less, with respect to the center of the transmitter antenna 455 in the short-axis direction, both the antennas 455 and 405 can wirelessly transmit or receive power with designated power intensity.

Figure 6:
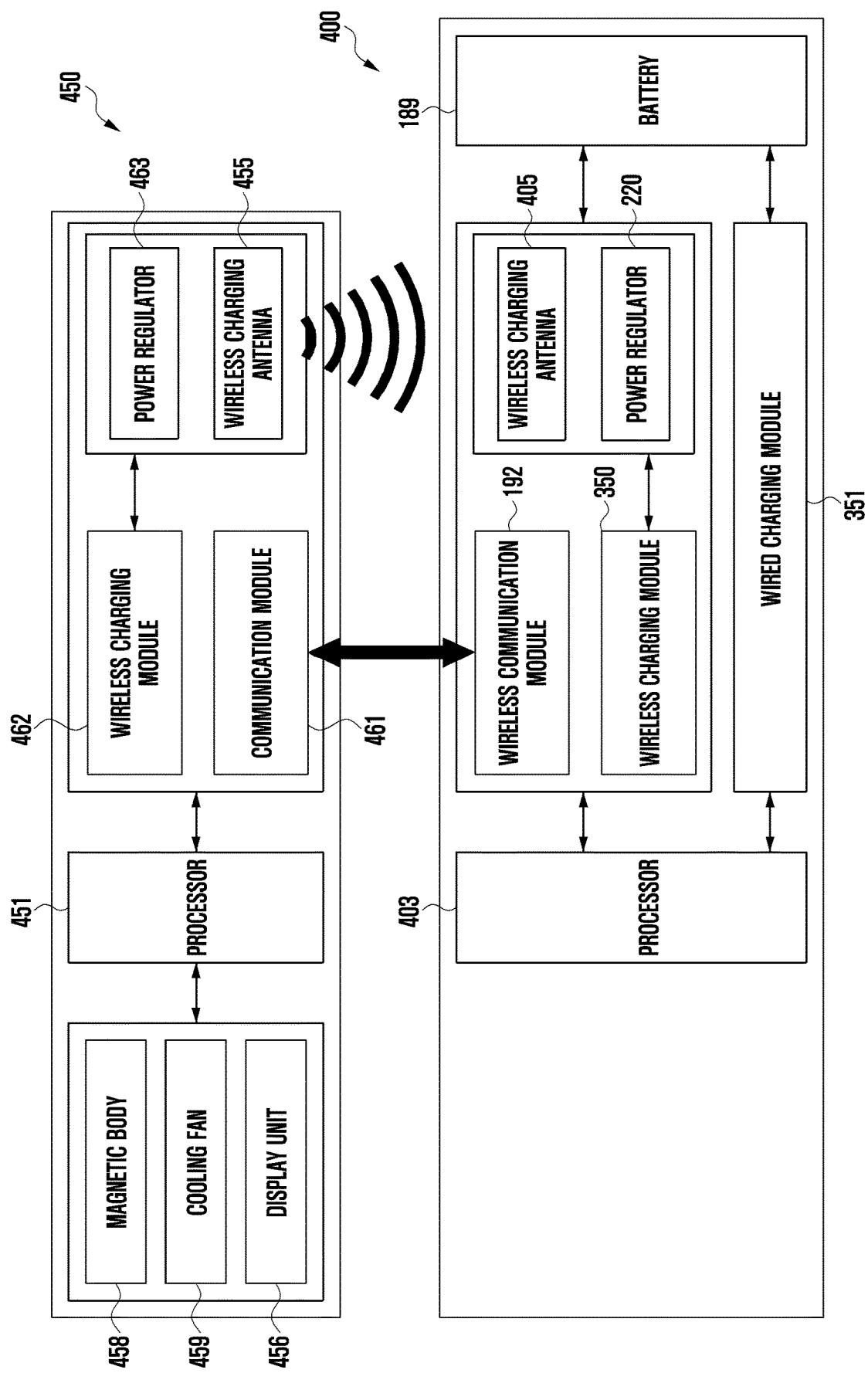
FIG. 6 is a block diagram of the electronic device 400 and a wireless charging device 450 according to certain embodiments of the disclosure.

FIG. 6 is a block diagram of the electronic device 400 and the wireless charging device 450 according to certain embodiments of the disclosure.

According to certain embodiments, the electronic device 400 may receive power through communication with the wireless charging device 450, and may charge the battery 189. For example, the processor 403 (e.g., the processor 120 in FIG. 1) of the electronic device 400 may control the wireless charging module 350 or the wired charging module 351 to charge the battery 189 of the electronic device 400 using any one of the wireless charging module 350 (e.g., the wireless charging module 350 in FIG. 3) or the wired charging module 351.

For example, the processor 403 of the electronic device 400 may determine a charging method based on the type of external power source (e.g., a power adaptor, a USB or wireless charging), and may charge the battery 189 using the determined charging method. For example, the processor 403 may determine whether an external power source is connected over wires through a connection terminal (e.g., the connection terminal 178 in FIG. 1) or whether the external power source is wirelessly connected through an antenna module (e.g., the antenna module 197 in FIG. 1), and may charge the battery 189 using the wired charging module 351 or the wireless charging module 350. For example, the wireless charging module 350 of the electronic device 400 may wirelessly receive power through the wireless charging antenna 405 (e.g., the wireless charging antenna 397-5 in FIG. 3). For example, the wireless charging antenna 405 may be positioned in one edge portion of the electronic device 400.

For example, the electronic device 400 may include a power regulator (e.g., the power regulator 220 in FIG. 2). The power regulator 220 may regulate wirelessly received power in a voltage and/or current level suitable for elements included in the electronic device 400. For example, the power regulator 220 may include a rectifier and a converter (e.g., DC-DC buck converter).

For example, the electronic device 400 may include the wireless communication module 192. For example, the electronic device 400 may transmit, to the wireless charging device 450, information related to the charging of the electronic device 400 using the wireless communication module 192. For example, the wireless communication module 192 may include a short-distance wireless communication module, such as Bluetooth.

The wireless charging device 450 according to certain embodiments may wirelessly transmit power to at least one electronic device 400 under the control of the processor 451. For example, the processor 451 of the wireless charging device 450 may control power to be transmitted from the wireless charging antenna 455 to external devicesusing the wireless charging module 462. The processor 451 may receive charging-related information from the electronic device 400 using the wireless communication module 461. The processor 451 may control power to be transmitted to the external devices based on the received charging-related information. For example, the wireless charging module 462 may regulate a voltage and/or current level for power to be transmitted using the power regulator 463, and may wirelessly transmit power to the external devices using the wireless charging antenna 455.

For example, the processor 451 of the wireless charging device 450 may control the driving of the magnetic body 458 (e.g., permanent-electro magnet), the cooling fan 459 and the display unit 456 based on information whether the wireless charging device 450 is connected to the electronic device 400 or charging-related information received from the electronic device 400.

Figure 7A:
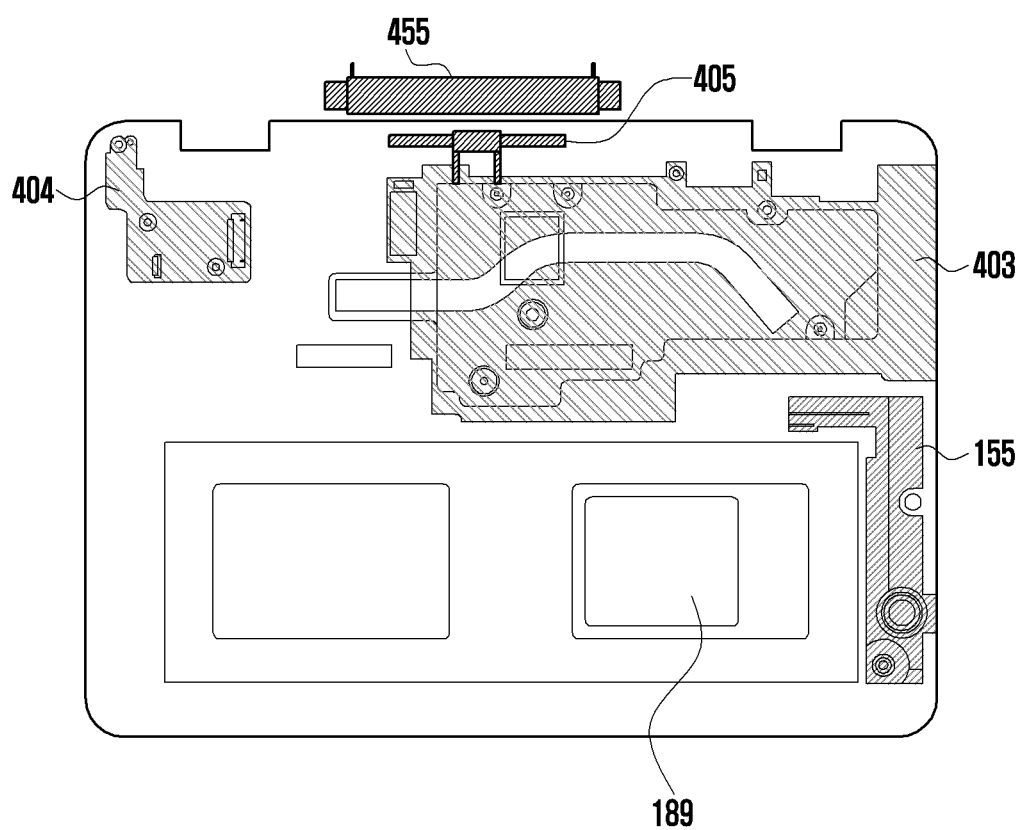
FIG. 7A is a diagram describing the location where a wireless charging antenna 405 is positioned in the electronic device 400 according to an embodiment of the disclosure.

FIG. 7A is a diagram for describing the location where a wireless charging antenna 405 is positioned in the electronic device 400 according to an embodiment of the disclosure.

Referring to FIG. 7A, the electronic device 400 according to certain embodiments may include a processor (or PCB on which the processor is mounted) 403, an auxiliary processor 404, the sound output device (e.g., speaker) 155, the battery 189, and the wireless charging antenna 405.

For example, the wireless charging antenna 405 of the electronic device 400 may be positioned within the electronic device 400 in such a way as to be adjacent to one edge of the electronic device 400, in order to efficiently receive power transmitted by the wireless charging antenna 455 of an external wireless charging device (e.g., the wireless charging device 450 in FIG. 4A to 4D or 6). For example, the processor 403 may control the device 400 to charge the battery 189 using power received through the wireless charging antenna 405 of the electronic device 400.

Figure 7B:
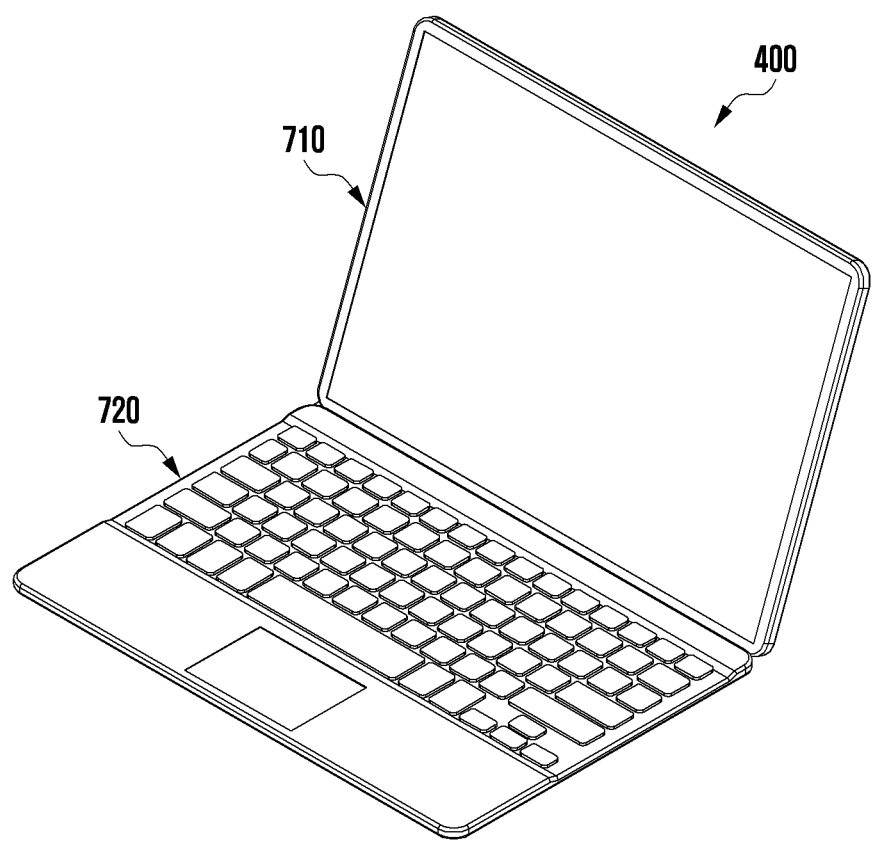
FIG. 7B is a perspective view of the electronic device 400 according to an embodiment of the disclosure.

FIG. 7B is a perspective view of the electronic device 400 according to an embodiment of the disclosure.

The electronic device 400 according to certain embodiments may include a display unit 710 and a main body unit 720. For example, the display unit 710 may have a display (e.g., the display 160 in FIG. 1) on its one side. The main body unit 720 may have a user input device (e.g., the input device 150 in FIG. 1) (e.g., keyboard) on its one side.

The electronic device 400 according to certain embodiments may include a wireless charging antenna (e.g., the wireless charging antenna 405 in FIG. 7A) housed within the main body unit 720. For example, the main body unit 720 of the electronic device 400 may include a housing, including a first face in which the user input device is positioned, a second face (e.g., back surface) oriented towards a direction opposite the first face, and a third face (e.g., a side surface) between the first face and the second face. For example, the wireless charging antenna may be positioned on an edge portion of the main body unit 720 within the housing as to be adjacent to at least some portion of the third face. The wireless charging antenna may operate via control by the processor of the electronic device 400, and may wirelessly receive power from the external charger for charging a battery.

According to another embodiment, the wireless charging antenna may be positioned within a housing, including a first face in which the display of the display unit 710 is positioned, a second face (e.g., front surface) oriented towards a direction opposite the first face, and a third face (e.g., side surface) between the first face and the second face. For example, the wireless charging antenna may be positioned on an edge portion of the display unit 710 in such a way as to be adjacent to at least some area of the third face within the housing. For example, the electronic device 400 may be configured in a tablet form in which the display unit 710 and the main body unit 720 are integrated.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
 a plurality of wireless charging antennas;
 a plurality of shielding partition layers, at least some of the plurality of shielding partition layers disposed between the plurality of wireless charging antennas;

a plurality of external device-receiving grooves formed through spaces defined between pairs of the shielding partition layers; and a processor electrically coupled to the plurality of wireless charging antennas, wherein the processor is configured to:

determine whether at least one external device is inserted into at least one of the plurality of external device-receiving grooves, and when the at least one external device is inserted into the at least one of the plurality of external device-receiving grooves, wirelessly transmit power through at least one wireless charging antenna corresponding to the at least one of the plurality of external device-receiving grooves into which the at least one external device is inserted, wherein the external device-receiving grooves are formed to have a space which at least one side of the external device is inserted into, each of the plurality of wireless charging antennas comprises a solenoid coil having a diameter greater than its length, the solenoid coil is positioned to contact the inserted at least one side of the external device, and the solenoid coil is extended lengthwise to be parallel with the inserted at least one side of the external device.

2. The electronic device of claim 1, wherein the plurality of shielding partition layers each comprise a shielding material that blocks interference generated from signals transmitted by other wireless charging antennas.

3. The electronic device of claim 1, further comprising a communication circuit, wherein the processor is configured to:

transceive charging information with at least one external device inserted into at least one of the plurality of external device-receiving grooves using the communication circuit.

4. The electronic device of claim 3, wherein the communication circuit includes a short-distance wireless communication circuit.

5. The electronic device of claim 3, wherein the processor is configured to:

transmit at least a portion of the charging information to a second electronic device using the communication circuit.

6. The electronic device of claim 1, further comprising:

a housing including a first side defining a first surface on which the wireless charging antennas and the processor are mounted;

air vents formed on the first side of the housing; and a cooling fan disposed on a second side opposite the first side on which the air vents are formed.

7. The electronic device of claim 6, wherein the processor is configured to:

control operation of the cooling fan based on temperature information received from at least one external device.

8. The electronic device of claim 6, wherein the first side on which the air vents are formed corresponds to one of the plurality of external device-receiving grooves.

9. The electronic device of claim 1, further comprising:

a display unit displaying an image indicating whether the at least one external device is inserted and/or the level of charge for the inserted external device.

10. The electronic device of claim 1, wherein the processor is further configured to:

control, according to a designated condition, transmission of power through at least one wireless charging antenna for an external device-receiving groove into which the external device is inserted.

11. The electronic device of claim 1, further comprising:

a housing; and a plurality of permanent-electro magnets disposed in an interior of the housing, each corresponding to one of the plurality of external device-receiving grooves, wherein the processor is configured to:

control magnetism of the permanent-electro magnet based on charge information of the inserted at least one external device.

12. The electronic device of claim 1, further comprising a plurality of heat pipes disposed adjacent to the plurality of wireless charging antennas.

13. The electronic device of claim 1, wherein the plurality of external device-receiving grooves are configured to be at least partially inclined relative to a base of the electronic device.

14. The electronic device of claim 1, wherein the external device comprises a second wireless charging antenna for receiving power wirelessly, the second wireless charging antenna disposed on the inserted side of the external device, and wherein the processor is further configured to transmit power to the external device when a first side of the external device is inserted into the electronic device such that the second wireless charging antenna is oriented towards the external device-receiving grooves.

* * * * *